(12) United States Patent
Gradu

(10) Patent No.: US 7,410,017 B2
(45) Date of Patent: Aug. 12, 2008

(54) ELECTRIC DRIVE AXLE

(75) Inventor: Mircea Gradu, Massillon, OH (US)

(73) Assignee: The Timken Company, Canton, OH (US)

( * ) Notice: Subject to any disclaimer, the term of this patent is extended or adjusted under 35 U.S.C. 154(b) by 319 days.

(21) Appl. No.: 10/999,327

(22) Filed: Nov. 30, 2004

(65) Prior Publication Data

US 2006/0116233 A1 Jun. 1, 2006

(51) Int. Cl.
*B60K 1/00* (2006.01)
(52) U.S. Cl. .................. 180/65.6; 180/65.1; 180/375; 475/150
(58) Field of Classification Search ............ 180/65.1, 180/65.6, 65.7, 374, 375, 245; 475/150, 475/151
See application file for complete search history.

(56) References Cited

U.S. PATENT DOCUMENTS

| 5,279,384 | A |   | 1/1994  | Shibahata et al. |
|-----------|---|---|---------|------------------|
| 5,419,406 | A | * | 5/1995  | Kawamoto et al. ......... 180/65.6 |
| 5,718,300 | A | * | 2/1998  | Frost .................... 180/65.1 |
| 5,845,546 | A | * | 12/1998 | Knowles et al. ............ 74/650 |
| 5,947,855 | A | * | 9/1999  | Weiss ........................ 475/5 |
| 5,979,631 | A | * | 11/1999 | Lundstrom ............ 192/85 CA |
| 6,276,474 | B1| * | 8/2001  | Ruppert et al. ........... 180/65.6 |
| 6,327,935 | B1| * | 12/2001 | Joslin et al. ............... 74/650 |
| 6,595,308 | B2|   | 7/2003  | Bowen |
| 6,604,591 | B2|   | 8/2003  | Bowen et al. |
| 6,615,946 | B2| * | 9/2003  | Pasquini et al. ............ 180/248 |
| 6,688,412 | B2| * | 2/2004  | Kima et al. .............. 180/65.5 |
| 6,712,728 | B2| * | 3/2004  | Gradu ..................... 475/152 |
| 6,712,730 | B2| * | 3/2004  | Gradu ..................... 475/218 |
| 6,755,762 | B2|   | 6/2004  | Gradu |
| 7,000,717 | B2| * | 2/2006  | Ai et al. ................. 180/65.2 |
| 7,137,921 | B2| * | 11/2006 | DeGowske ............... 475/231 |
| 7,201,696 | B2| * | 4/2007  | DeGowske ............... 475/231 |
| 2003/0181278 | A1 | * | 9/2003 | Gradu ................... 475/154 |
| 2004/0200648 | A1 | * | 10/2004 | Tarasinski et al. ......... 180/65.7 |
| 2004/0222030 | A1 |   | 11/2004 | Szalony et al. |

FOREIGN PATENT DOCUMENTS

| DE | 10219921 A1 | 11/2003 |
| EP | 0442437     | 8/1991  |
| WO | WO 03/083326 | 11/2004 |

OTHER PUBLICATIONS

International Preliminary Report on Patentability from Corresponding International Appln. No. PCT/US2005/043015; Date of mailing: Jun. 14, 2007—8 pages.

* cited by examiner

*Primary Examiner*—Jeffrey J Restifo
(74) *Attorney, Agent, or Firm*—Polster, Lieder, Woodruff & Lucchesi, L. C.

(57) ABSTRACT

An electric drive axle, which is located between and powers the left and right drive wheels of an automotive vehicle, includes an electric motor and left and right torque couplings. Torque developed by the motor transfers through the torque couplings to axle shafts which are connected to the drive wheels. Each torque coupling includes a magnetic particle clutch and a planetary set organized such that the current flowing through the electromagnet of the clutch controls the torque delivered through the coupler. The magnetic particle clutches also accommodate slippage so that the drive wheels may rotate at different angular velocities.

11 Claims, 6 Drawing Sheets

US 7,410,017 B2

ELECTRIC DRIVE AXLE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

This invention relates in general to automotive vehicles and, more particularly, to an electrically-powered drive axle for an automotive vehicle.

The typical automobile derives all the power required to propel it from an internal combustion engine which is coupled to left and right drive wheels through a transmission and differential. Indeed, the differential divides the torque produced by the engine evenly between the drive wheels to which it is coupled. Recently several automotive manufacturers have demonstrated an interest in automobiles that in one way or another utilize electric motors to propel the vehicles. But these vehicles still rely on differentials of conventional construction to divide torque between the left and right drive wheels and to accommodate variations in speed between the drive wheels, such as when the vehicle negotiates a turn.

However, an equal division of torque between the drive wheels on each side of a differential is not always desirable. For example, if the traction available to one of the drive wheels is diminished, most of the torque should flow to the other drive wheel. Also in turns, handling improves if most of the torque flows to the drive wheel on the outside of the turn.

DETAIL DESCRIPTION OF THE INVENTION

Figure 1:
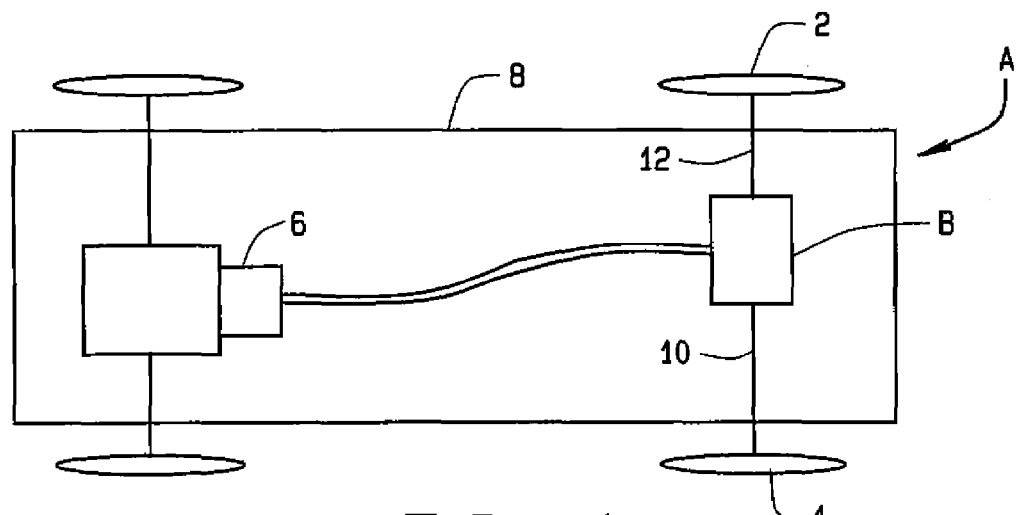
FIG. 1 is a schematic view of an automotive vehicle provided with an electric drive axle constructed in accordance with an embodying the present invention.
Figure 2:
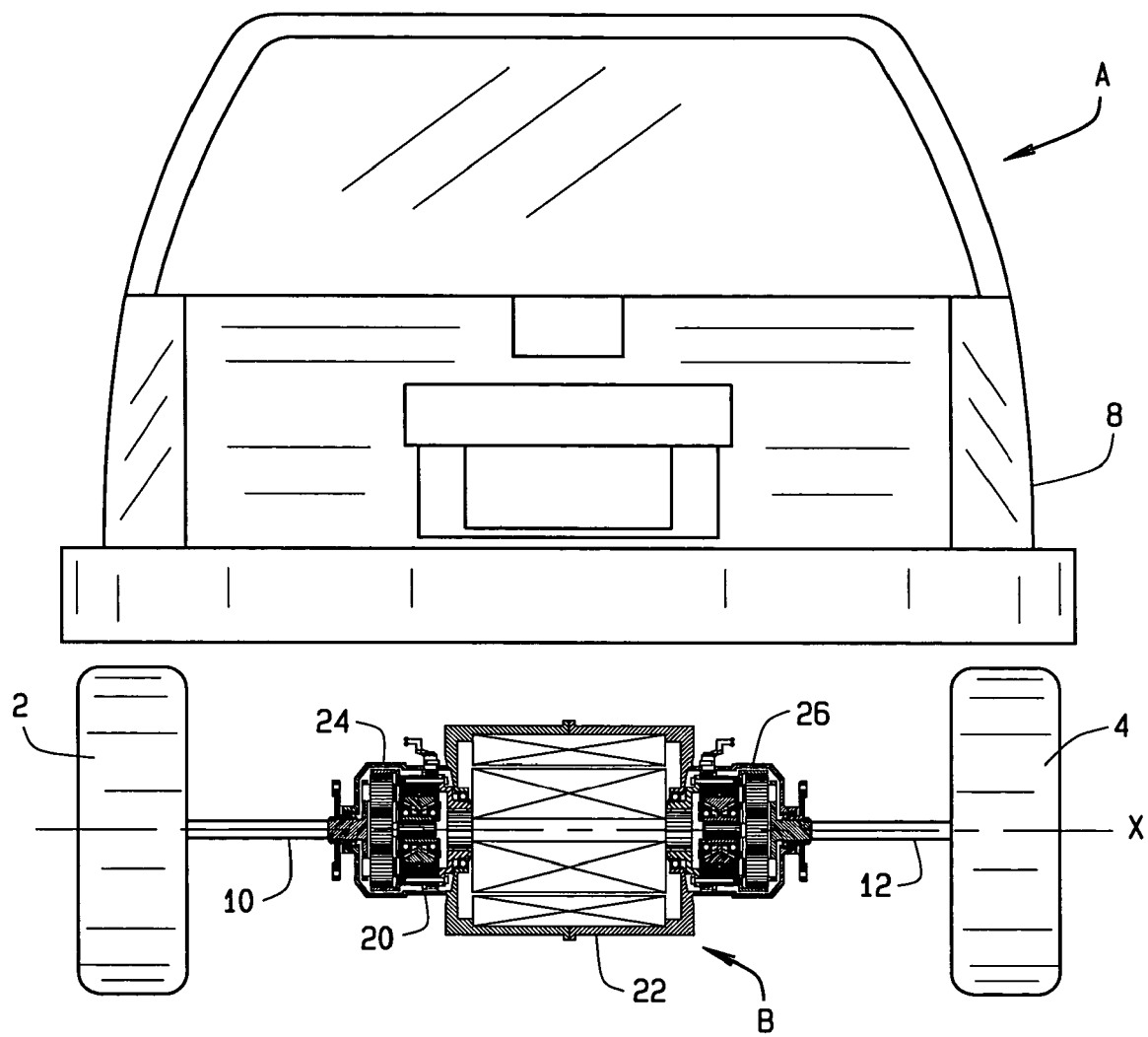
FIG. 2 is an end view of the vehicle cut away to show the electric drive axle.

Referring now to the drawings, an automotive vehicle A (FIG. 1) has a left and right drive wheels 2 and 4, respectively, that are powered through an electric drive axle B. To this end, the vehicle A has a source 6 of electrical energy, which could be a generator powered by an internal combustion engine or a bank of batteries or even fuel cells. In any event, the energy source 6 and the drive axle B are mounted on a supporting structure 8, which could be a frame or a unified body, and the supporting structure 8 is in turn supported in part by the wheels 2 and 4. The drive axle B is coupled to the wheels 2 and 4 through left and right axle shafts 10 and 12. It is organized about an axis X and includes (FIG. 2) a housing 20, an electric motor 22, and left and right torque bias couplings 24 and 26, respectively. The motor 18 and couplings 24 and 26 are located within the housing 20.

Figure 3:
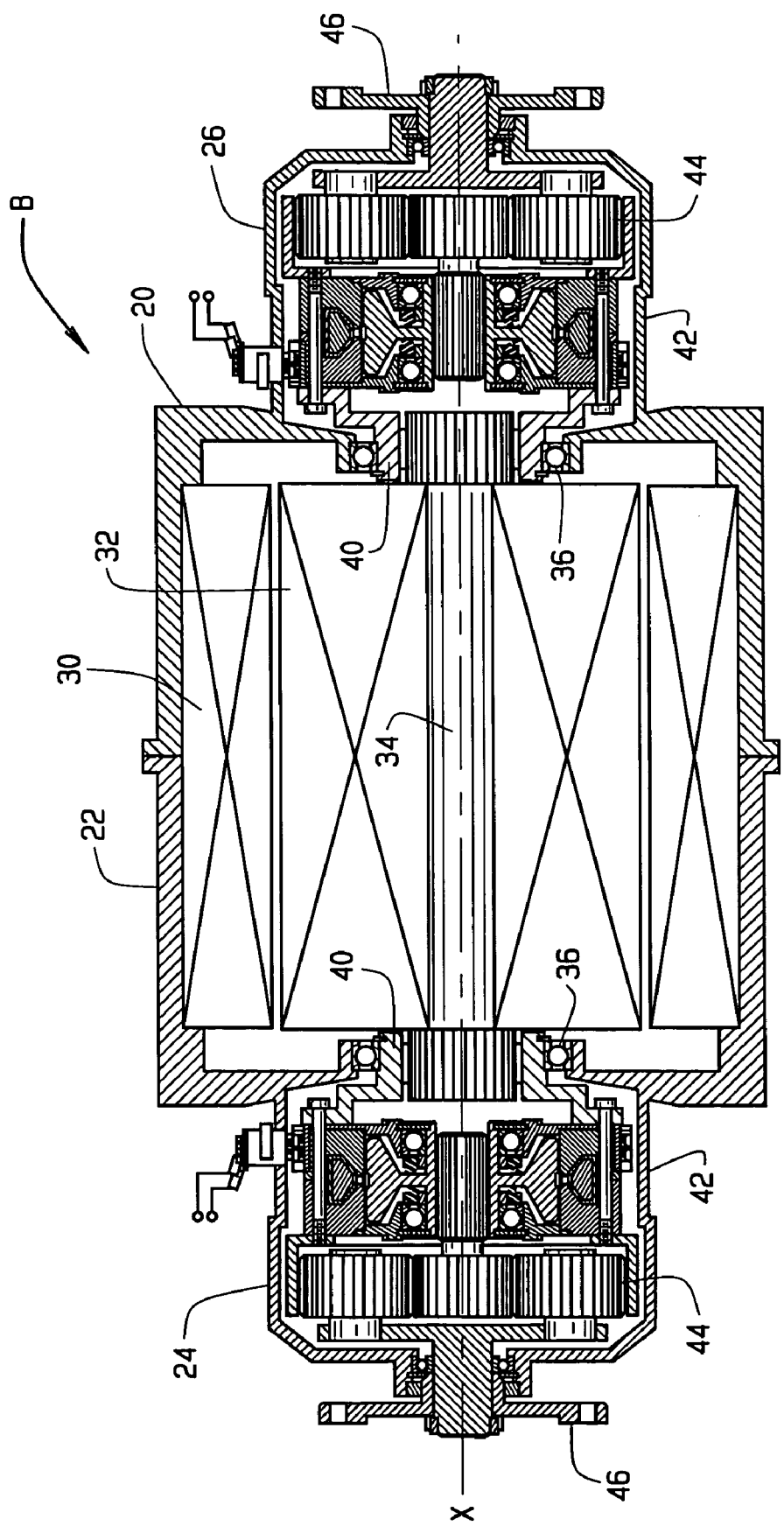
FIG. 3 is a sectional view of the drive axle.

The motor 22, which is of the radial flux construction, includes (FIG. 3) a stator 30 which is mounted in the housing 20 in a fixed position around the axis X. It also includes a rotor 32 which is located within the stator 30 where it revolves about the axis X. The rotor 32 includes a motor shaft 34 which at its ends is supported in the housing 20 on antifriction bearing 36.

The housing 20 also encloses the two torque couplings 24 and 26, each of which includes a drive hub 40, a magnetic particle clutch 42, a planetary gear set 44, and a drive flange 46. They too are organized along the axis X.

The two drive hubs 40 are connected to the motor shaft 34 of the rotor 32 through splines or other devices which enable them to rotate with the shaft 34 and transfer torque from the rotor 32 to their respective torque couplings 24 and 26. Indeed, the two drive hubs 40 rotate in the bearings 36 and support the shaft 34 and likewise the rotor 32 on the bearings 36. The drive flanges 46 are for the most part located externally of the housing 20 and serve to couple their respective torque couplings 24 and 26 to the axle shafts 10 and 12. The drive hubs 40 function as torque input members, whereas the drive flanges 46 serve as torque output members.

Figure 4:
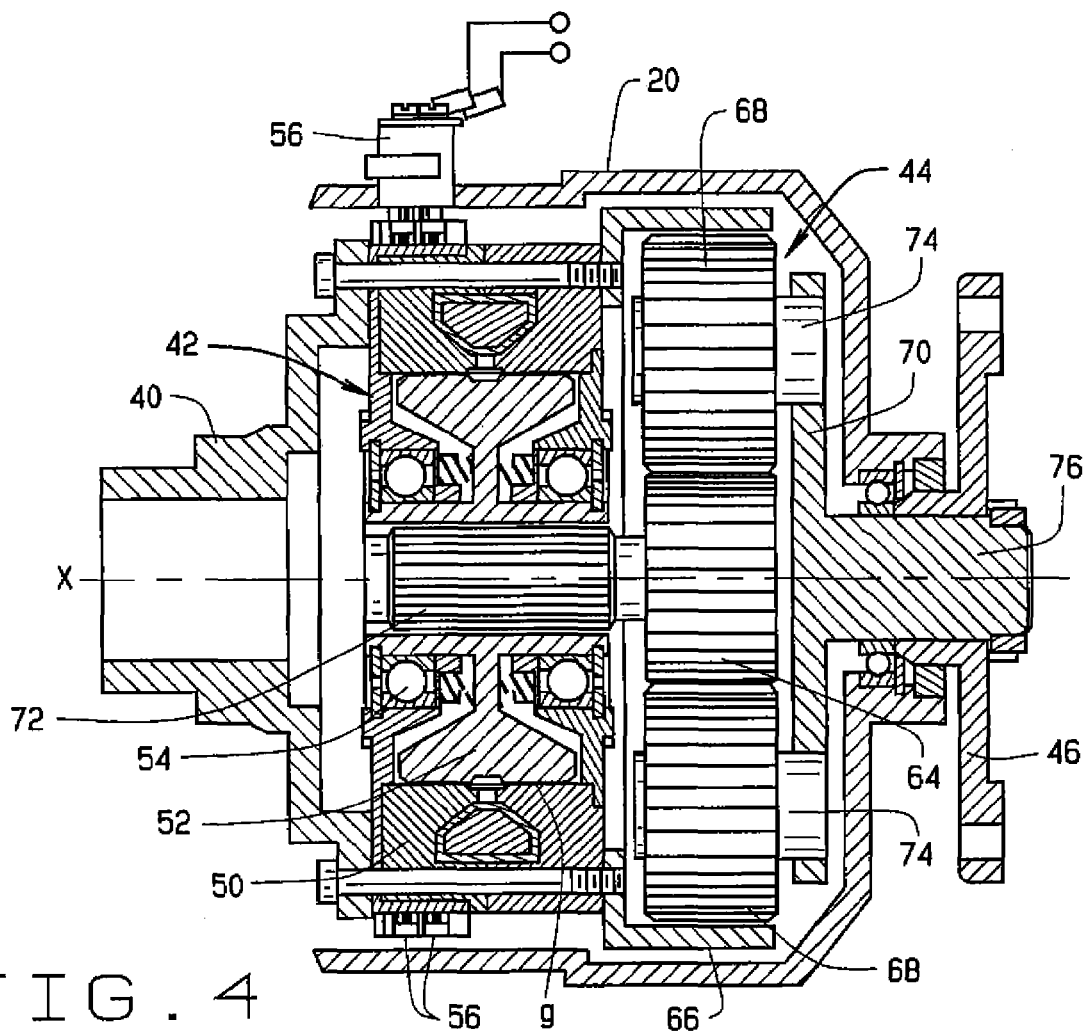
FIG. 4 is an enlarged sectional of one of the torque coupling in the drive axle.

The clutch 42 for each torque coupling 24 and 26 includes (FIG. 4) an electromagnet 50 and an armature 52. Both are annular in configuration and are organized about the axis X. The armature 52 resides within the electromagnetic 50, with the two being separated by antifriction bearings to the maintain a uniform annular gap g between them. The gap g contains magnetic particles. In the absence of a magnetic field at the gap g, the magnet 50 and armature 52 can rotate, essentially freely with respect to each other. However, when an electrical current is directed through the magnet 52, torque applied to the magnet 52 will transfer to the armature 54. Some slippage between the two may and in most instances will occur. The magnet 50 around its periphery carries slip rings 56 which are wiped by brushes 58 fitted to the housing 20. The brushes 58 in turn are connected to a source of electrical energy, the potential of which may be varied to vary the current in the electromagnet 52 and the strength of the magnetic field it produces. This controls the torque transferred by the clutch 42.

The electromagnet 50 of the clutch 42 is secured firmly to the flange of the drive hub 36 at that end of the motor shaft 34 nearest the coupling 24 or 26 of which the clutch 42 is a component. Thus, the electromagnet 50 rotates with the rotor 32 of the electric motor 32. Should the electromagnet 50 be energized, torque applied to the electromagnet 52 will transfer to the armature 54.

The planetary set 44 for each torque coupling 24 and 26 includes (FIG. 4) a sun gear 64, a ring gear 66, and planet gears 68 located between and engaged with the sun and ring gears 64 and 66. In addition, it has a carrier 70 which establishes the axes about which the planet gears 68 rotate. The sun gear 64 lies along the axis X, its axis coinciding with the axis X. It is provided with a stub shaft 72 which projects into the armature 52 of the clutch 42, to which it is coupled through mating splines. The ring gear 66 is attached to the electromagnet 54 of the clutch 42 and to the flange on the drive hub 40 at the end of the motor shaft 34, so that the hub 36, the electromagnet 54, and the ring gear 66 rotate in unison about the axis X and at the same angular velocity. The carrier 70 has pins 74 which project into the planet gears 68, so that the planet gears 68, when they rotate, revolve about the pins 74. The pins 74 thus establish the axes of rotation for the planet gears 68. In addition, the carrier 70 has a spindle 76 which projects through the end of the housing 20 and there is fitted with the drive flange 46. The left axle shaft 10 is connected through a universal joint to the drive flange 46 for the left torque coupling 24, whereas the right axle shaft 12 is connected through another universal joint to the drive flange 46 of the right torque coupling 26. The motor 22 drives the two axle shafts 10 and 12 through their respective torque couplings 24 and 26. The magnetic particle clutches 24 and 26 control the distribution of torque to the two axle shafts 10 and 12.

Figure 5:
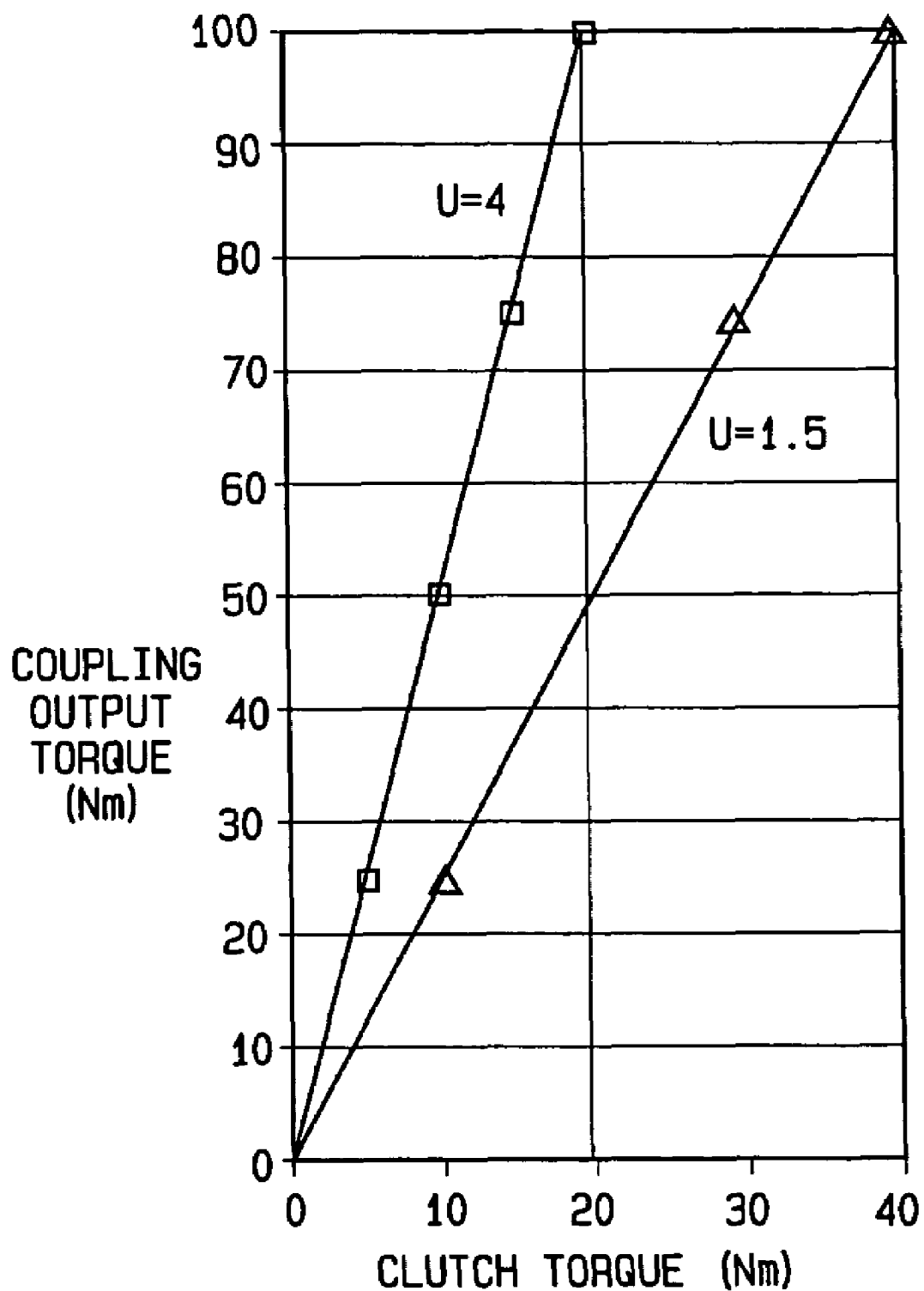
FIG. 5 is a graph showing the relationship between torque transferred through one of the torque couplings and the torque transferred through the magnetic particle clutch of that coupling.

In the operation of the drive axle A, the electrical energy source 6 produces an electrical current which powers the motor 22, causing the rotor 32 and motor shaft 34 of the motor 22 to rotate about the axis X. The motor shaft 34 delivers the torque to the two torque couplings 24 and 26. In each torque coupling 24 and 26, torque from the motor 22 is applied through the hub 40 at that coupling 24 or 26 to the electromagnet 50 of the clutch 42 and to the ring gear 66 of the planetary set 44 simultaneously. Here the torque splits. Some of it passes from the ring gear 66 through the planetary gears 68 to the carrier 70 and thence to the drive flange 46 through the spindle 76. The remainder of the torque, assuming that the electromagnet 50 of the clutch 42 is energized, passes through the gap g to the armature 52 of the clutch 42. The armature 52 rotates and transfers the component of the torque passing through the clutch 42 to the sun gear 64 of the planetary set 44, inasmuch as the armature 52 and sun gear 64 are coupled through the stub shaft 72 of the latter. The sun gear 64 transfers the torque to the planet gears 68 where it combines with the torque transferred from the ring gear 66, so that the carrier 70 and the drive flange 78 see essentially the full torque applied at the hub 40. In other words, the torque flows through each torque coupling 24 and 26 in two paths—a mechanical path, including the ring gear 68, planet gears 68 and carrier 70, and a clutch path, including the electromagnet 50 and armature 52 of the clutch 42, and the sun gear 64, planet gears 68 and carrier 70, of the planetary set 44. Most of the torque transfers through the mechanical path, with the apportionment between the two paths depending on the gear ratio U between ring gear 66 and the sun gear 64. The higher the ratio, the less the amount of torque transferred through the clutch path. The relationship between the torque in the two paths may be expressed with a plot on Cartesian coordinates (FIG. 5). The arrangement is such that a small change in torque transferred through the clutch 42 results in a much greater change in torque transmitted through the coupling 24 or 26 of which the clutch 42 is a component, and the torque transmitted through the clutch 42 is dependent on the magnitude of the current passing through the electromagnet 50 of the clutch 42. The torque varies almost linearly with the current passing through the electromagnet 50.

By controlling the current in the clutches 42 of the two torque couplings 24 and 26, the torque can be divided between the two drive wheels 2 and 4 to best accommodate the driving conditions under which the vehicle A operates. For example, if the vehicle A negotiates a left turn, particularly at higher speeds, more torque should be delivered the right drive wheel 2 than to the left drive wheel 4. The clutches 42 in the two torque couplings 24 and 26 are adjusted accordingly. To this end the vehicle A may be provided with accelerometers for determining lateral and longitudinal accelerations and yaw, and hence the severity of turns negotiated, as well as speed sensors for determining the velocities of the two axle shafts 10 and 12, preferably from the antilock braking system for the wheels 2 and 4. More sensors may determine the position of the steering wheel and the temperatures of the clutches 42 and of the wheel service brakes. These sensors produce signals which may be fed to a microprocessor in the vehicle, which microprocessor would determine the best apportionment of torque between the two driving wheels 2 and 4 and control the current in the clutches 42 of the two torque couplings 10 and 12 accordingly.

Figure 6:
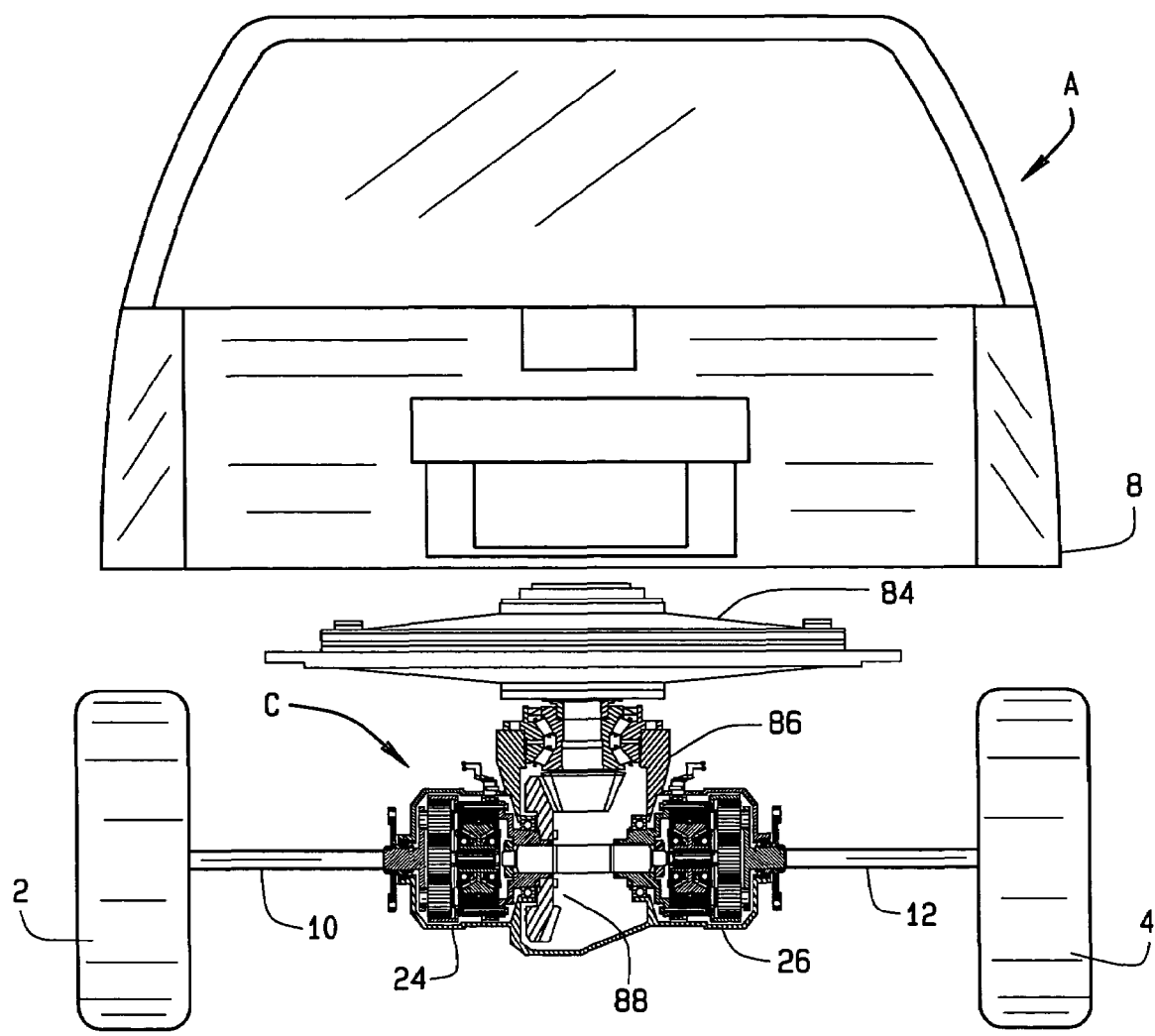
FIG. 6 is an end view of a vehicle provided with a modified electric drive axle.
Figure 7:
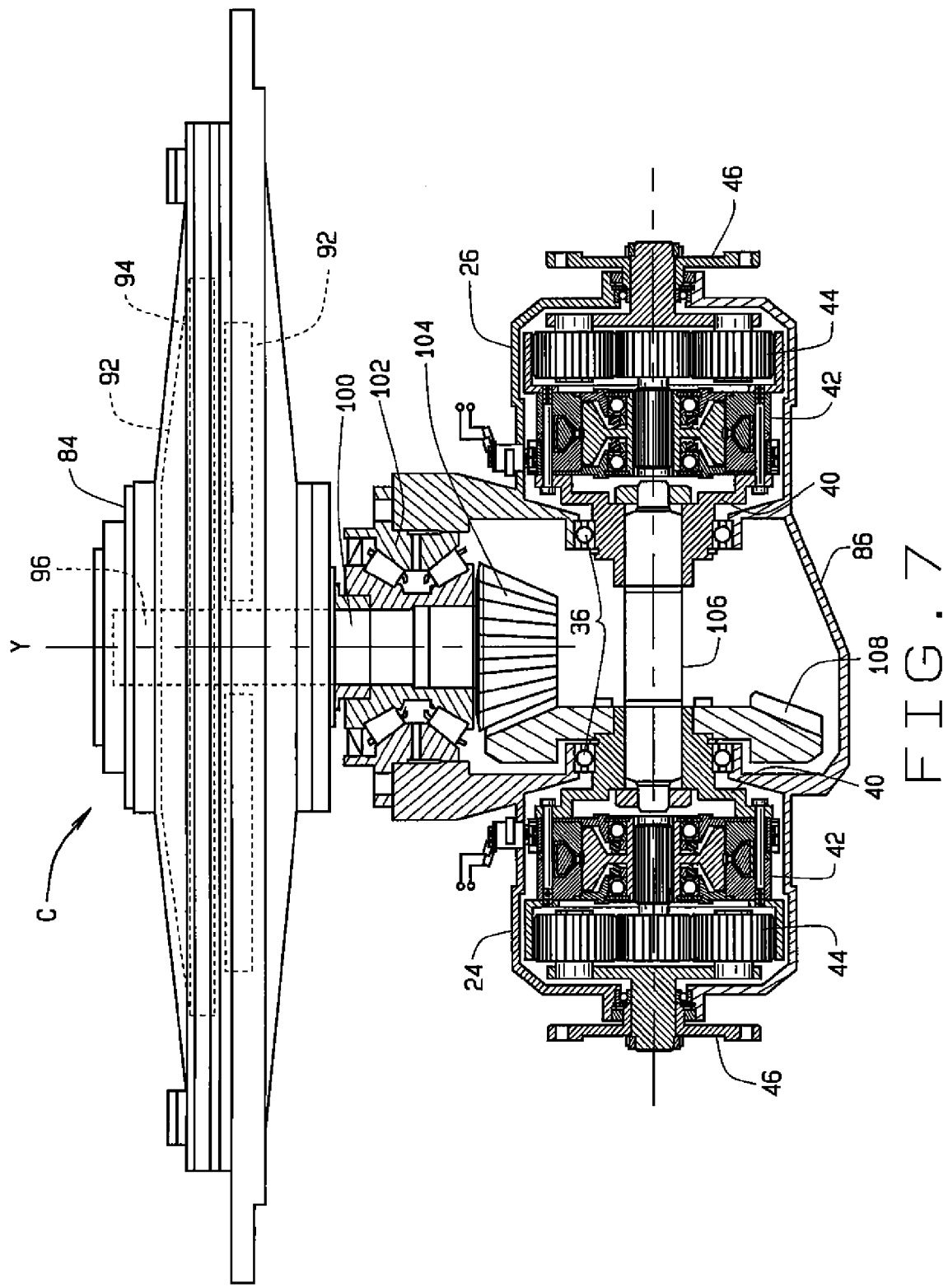
FIG. 7 is a sectional view of the modified electric drive axle.

A modified electric drive axle C (FIGS. 6 & 7) likewise distributes torque between the left and right drive wheels 2 and 4, apportioning it best to respond to the conditions under which the vehicle A operates. It includes (FIG. 7) an axial flux motor 84, a housing 86 in which the two torque couplings 24 and 26 are enclosed, and a right angle drive 88 located within the housing 86 between the motor 84 and the hubs 40 of the torque couplings 24 and 26.

The motor 84 includes a stator 92 and a rotor 94, as well as a motor shaft 96 in which the rotor 94 is mounted. The shaft 96 rotates about an axis Y oriented at a right angle to the axis X.

The right angle drive 88 includes a pinion shaft 100 which rotates in the housing 86 about the axis X on antifriction bearings 102. One end of the shaft 100 is connected to the motor shaft 94, while the other end has a beveled pinion 104 on it. In addition, the right angle drive 88 has a connecting shaft 106 which extends between the two hubs 40 and rotates about the axis X. Its ends are fitted to the two drive hubs 40 with mating splines, and the hubs 40 rotate in the housing 86 on bearings 36. Finally, the right angle drive 88 has a beveled spur gear 108 which is fitted securely the hub 36 at the torque coupling 24. The spur gear 108 meshes with the pinion 104.

The motor 84, when energized, applies torque to and rotates the pinion shaft 100. The pinion 104 at the end of the shaft 100 rotates the spur gear 108 which in turn rotates the connecting shaft 106 and the hubs 40 at the end of it. The hubs 40 deliver the torque to the torque couplings 24 and 26 which function as they do in the drive axle A.

Other so-called "hook ups" are possible for the two torque couplings 24 and 26—one, for example, in which the armature 52 of the clutch 42 may be connected to the drive hub 40. Also the positions of the clutch 42 and 44 in each of the torque couplings 24 and 26 may be reversed, with the clutch 42 being connected to the drive flange 46.

The invention claimed is:

1. A drive axle for an automotive vehicle having left and right drive wheels, said drive axle comprising:
    an electric motor having a rotor;
    left and right torque couplings, each torque coupling including an input torque member driven by the rotor of the electric motor and an output torque member and also a magnetic particle clutch and planetary gear set arranged between the input and output members such that torque developed by the motor and applied to the input member is transferred through the clutch and planetary set to the output member, with the torque transferred being controlled by the clutch, the output member of the left torque coupling being adapted for connection to the left drive wheel and the output member of the right torque coupling being adapted for connection to the right drive wheel; and
    an angle drive located between the motor and the torque couplings, the angle drive including a pinion connected to the rotor of the electric motor and driven by the motor, a connecting shaft located between the two torque couplings and connected to the input torque members of the couplings, and a spur gear on the connecting shaft and engaged with the pinion.

2. A drive axle according to claim 1 wherein the clutch of each torque coupling includes an electromagnet and an armature located within the electromagnet; wherein the planetary set includes a sun gear, a ring gear coupled with the electromagnet of the clutch to rotate in unison with the electromagnet, planet gears located between the sun and ring gears, and a carrier having pins about which the planet gears rotate.

3. A drive axle according to claim 2 wherein the input torque member is connected to the electromagnet of the clutch and to the ring gear of the planetary set; wherein the armature of the clutch is connected to the sun gear of the planetary set; and wherein the carrier of the planetary set is connected to the output torque member.

4. A drive axle according to claim 1 wherein the torque transfers between the torque members of each torque coupling in a mechanical path which bypasses the clutch and a clutch path which passes through the clutch.

5. A drive axle according to claim 4 wherein the two paths converge in the planetary set.

6. A drive axle according to claim 4 wherein most of the torque passes through the mechanical path.

7. A drive axle according to claim 1 wherein the electric motor is an axial flux electric motor.

8. In an automotive vehicle having left and right drive wheels and left and right axle shafts connected to the left and right drive wheels respectively, for transferring torque to the drive wheels, an improved drive axle for generating torque and distributing it selectively to the axle shafts, said drive axle comprising:

an electric motor;

a left torque coupling connected between the motor and the left axle shaft; and a right torque coupling connected between the motor and the right axle shaft;

each torque coupling including a magnetic particle clutch having an electromagnet, and armature located within the electromagnet, and magnetic particles between the electromagnet and armature;

each torque coupling also including a planetary gear set having a sun gear, a ring gear, and a planet gear located between the sun and ring gears, the clutches and the planetary sets of the left and right clutches being organized along a common axis.

9. The combination according to claim 8 wherein the ring gear and one of the electromagnet or the armature of the clutch in each torque coupling are connected so that they rotate in unison at the same angular velocity.

10. The combination according to claim 9 wherein the motor is connected to the electromagnet of each torque coupling; and wherein the sun gear is connected to the armature of the torque coupling.

11. The combination according to claim 8 wherein for each coupling the motor is connected to and rotates the ring gear and the electromagnet of the clutch; wherein the armature of the clutch and the sun gear of the planetary set are connected; wherein the planetary set also has a carrier that provides axes about which the planet gears rotate; and wherein the carrier is connected to the axle shaft that is driven by the coupling.

* * * * *